US010400808B2

(12) United States Patent
Simpson et al.

(10) Patent No.: US 10,400,808 B2
(45) Date of Patent: Sep. 3, 2019

(54) ONE-SIDED FASTENER ASSEMBLY AND METHODS AND SYSTEMS FOR INSTALLING THE SAME

(71) Applicant: The Boeing Company, Chicago, IL (US)

(72) Inventors: Blake Alexander Simpson, Kent, WA (US); Mark A. Woods, Renton, WA (US); John E. Inman, Frontenac, MO (US)

(73) Assignee: The Boeing Company, Chicago, IL (US)

(*) Notice: Subject to any disclaimer, the term of this patent is extended or adjusted under 35 U.S.C. 154(b) by 605 days.

(21) Appl. No.: 15/066,080

(22) Filed: Mar. 10, 2016

(65) Prior Publication Data
US 2017/0261023 A1    Sep. 14, 2017

(51) Int. Cl.
F16B 13/06    (2006.01)
F16B 13/08    (2006.01)
F16B 4/00     (2006.01)
F16B 19/10    (2006.01)

(52) U.S. Cl.
CPC .......... F16B 13/0816 (2013.01); F16B 4/004 (2013.01); F16B 19/1081 (2013.01)

(58) Field of Classification Search
CPC .................. F16B 13/0816; F16B 19/1081
USPC ...................................................... 411/44–46
See application file for complete search history.

(56) References Cited

U.S. PATENT DOCUMENTS

| 2,302,590 | A | * | 11/1942 | Waite | F16B 19/1081 411/80.2 |
| 2,333,277 | A | * | 11/1943 | Swank | F16B 19/1081 411/80.1 |
| 2,751,809 | A | * | 6/1956 | Barker | B23K 35/365 411/15 |
| 2,774,098 | A | * | 12/1956 | Tieri | G02C 5/2209 16/228 |
| 3,029,912 | A | * | 4/1962 | Barker | F16B 19/1081 29/520 |
| 3,234,842 | A | * | 2/1966 | Sauter | F16B 19/1081 232/57 |

(Continued)

FOREIGN PATENT DOCUMENTS

GB    1122512 A    8/1968

OTHER PUBLICATIONS

Great Britain Combined Search and Examination Report for related Application No. GB1703733.4, dated Apr. 28, 2017, 5pp.

Primary Examiner — Gary W Estremsky
(74) Attorney, Agent, or Firm — Armstrong Teasdale LLP

(57) ABSTRACT

A one-sided fastener assembly for use in coupling an assembly stack-up includes a sleeve comprising an outer cylindrical surface and an inner tapered surface oriented at a first angle with respect to the outer surface. The inner tapered defines an opening extending through the sleeve. The fastener assembly also includes a core extending along an axis and configured for insertion into the opening. The core includes an outer tapered surface oriented at a second angle with respect to the axis configured for engagement with the sleeve inner tapered surface such that insertion of the core into the sleeve causes radial expansion of the sleeve creating an interference fit with the assembly stack-up to complete installation of the one-sided fastener assembly.

20 Claims, 10 Drawing Sheets

(56) References Cited

U.S. PATENT DOCUMENTS

| | | | | |
|---|---|---|---|---|
| 3,271,058 A | * | 9/1966 | Anderson | F16B 5/02 403/408.1 |
| 3,641,865 A | * | 2/1972 | Swindt | B21J 15/045 29/517 |
| 3,702,087 A | | 11/1972 | Schmitt | |
| 4,048,898 A | * | 9/1977 | Salter | F16B 5/02 29/446 |
| 4,137,817 A | | 2/1979 | Siebol | |
| 5,286,152 A | * | 2/1994 | Anderson | F16B 19/1081 411/41 |
| 5,628,581 A | * | 5/1997 | Hintz | E04B 9/02 403/380 |
| 5,771,553 A | * | 6/1998 | Sim | B25J 9/1687 29/407.09 |
| 6,862,864 B2 | * | 3/2005 | O'Banion | B21J 15/025 29/525.03 |
| 7,331,098 B2 | * | 2/2008 | Matthews | B21J 15/025 29/524.1 |
| 8,434,980 B2 | * | 5/2013 | Hsu | F16B 13/0858 411/45 |
| 8,496,394 B2 | * | 7/2013 | Schneider | F16B 3/06 403/370 |
| 8,920,086 B2 | * | 12/2014 | Stecher | F16B 2/04 411/57.1 |
| 2005/0169726 A1 | * | 8/2005 | McClure | F16B 19/1081 411/55 |
| 2012/0237289 A1 | | 9/2012 | Guerin | |
| 2014/0140785 A1 | | 5/2014 | Auriol | |
| 2015/0300533 A1 | | 10/2015 | Karls | |

\* cited by examiner

US 10,400,808 B2

ONE-SIDED FASTENER ASSEMBLY AND METHODS AND SYSTEMS FOR INSTALLING THE SAME

BACKGROUND

The field of the disclosure relates generally to couplings made between two or more mechanical components, and more specifically, to a one-sided fastener assembly and methods of installing the same.

At least some known fastening systems require manipulation of a fastener from both sides of the assembly that the fastener is meant to hold together. In some such systems, a human operator is located on each side of the assembly and manipulates a respective portion of the fastener to install it onto the assembly. However, such systems may incur higher labor costs and often introduce ergonomic issues. In other such systems, robotic machines are located on both sides of the assembly for fastener installation. However, such robotic machines may add complexity and require capital investment.

At least some known fastening systems install a one-sided fastener onto an assembly. However, such known systems use fasteners that include a large bulb on the backside of the assembly. Such bulbs provide only minor mechanical benefit and add a relatively large amount of weight to the assembly. Additionally, known fastening systems struggle to meet flushness requirements imparted for aerodynamic purposes. Furthermore, at least some known fasteners are complex in design, thus making them expensive to manufacture and install.

BRIEF DESCRIPTION

In one aspect, a one-sided fastener assembly for use in coupling an assembly stack-up is provided. The fastener assembly includes a sleeve comprising an outer cylindrical surface and an inner tapered surface oriented at a first angle with respect to the outer surface. The inner tapered surface defines an opening extending through the sleeve. The fastener assembly also includes a core extending along an axis and configured for insertion into the opening. The core includes an outer tapered surface oriented at a second angle with respect to the axis configured for engagement with the sleeve inner tapered surface such that insertion of the core into the sleeve causes radial expansion of the sleeve creating an interference fit with the assembly stack-up to complete installation of the one-sided fastener assembly In another aspect, a method of installing a one-sided fastener assembly into an assembly stack-up is provided. The method includes partially inserting a core of the one-sided fastener assembly into an opening defined in a sleeve of the one-sided fastener assembly. An inner tapered surface of the sleeve is configured to guide a corresponding outer tapered surface of the core. The method also includes locating a position in an assembly stack-up where the one-sided fastener assembly is to be installed and drilling a hole through the assembly stack-up at the position. The sleeve of the partially assembled one-sided fastener assembly is then inserted into the hole. The method also includes applying an axial force to the core to drive the core into the sleeve opening such that the sleeve creates an interference fit with the assembly stack-up to complete installation of the one-sided fastener assembly.

In still another aspect, a fastener installation system for installing a fastener assembly onto an assembly stack-up is provided. The system includes at least one fastener assembly having a sleeve including an outer cylindrical surface and an inner tapered surface defining an opening extending through the sleeve. The fastener assembly also includes a core extending along an axis and configured for insertion into the opening. The core includes an outer tapered surface configured for engagement with the inner tapered surface of the sleeve. The system also includes an end effector configured to insert the at least one fastener assembly into a hole defined in the assembly stack-up and a fastener driver coupled to the end effector. The fastener driver is configured to apply an axial force to the core to complete installation of the at least one fastener assembly.

The features, functions, and advantages that have been discussed can be achieved independently in various embodiments or may be combined in yet other embodiments further details of which can be seen with reference to the following description and drawings.

DETAILED DESCRIPTION

The embodiments described herein facilitate installing a one-sided fastener assembly into an assembly stack-up. The fastener assembly includes a sleeve and a core that are partially pre-assembled and inserted into a countersunk hole drilled in the assembly stack-up. After insertion, a robot or a technician drives the core into the sleeve causing the sleeve to radially expand into the hole. The core is driven until the front surface of the sleeve and the front surface of the core are substantially flush with the front surface of the assembly stack-up. When the core is driven as such, it forces an inner portion of the sleeve radially outward to create an interference fit with the assembly stack-up and to form a bulb on an inner surface of the assembly stack-up to help retain the fastener assembly in the structure.

As described herein, the fastener installation system causes the inner hole of the sleeve of the fastener assembly to expand to create an interference fit with the assembly stack-up. Such hole expansion is critical for fatigue related joints and is enabled by the tapered geometry and the material selection for the core (material with higher shear strength and lower ductility) and the sleeve (material with a lower shear strength and higher ductilty). Additionally, the fastener installation system described herein allows for enhanced flushness control because similar axial force is applied to each core such that the core is pushed to the same position on every installation of a fastener assembly.

Figure 1:
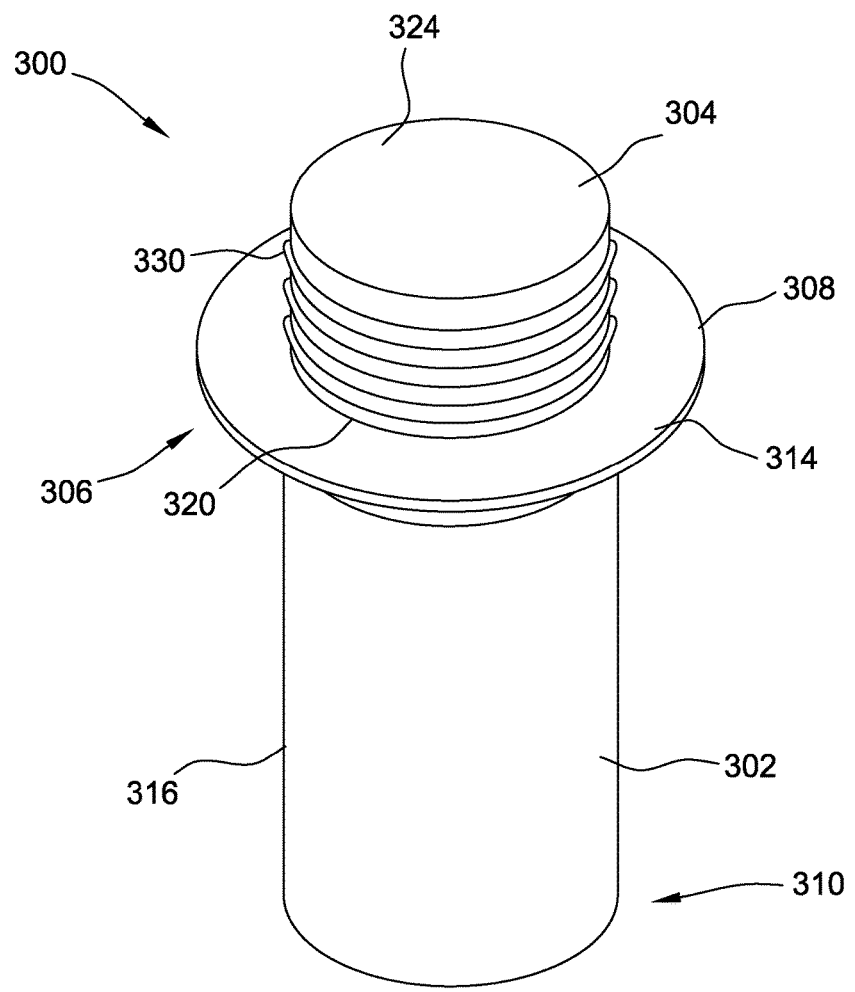
FIG. 1 is a perspective view of a partially assembled exemplary fastener assembly including a sleeve and a core.
Figure 2:
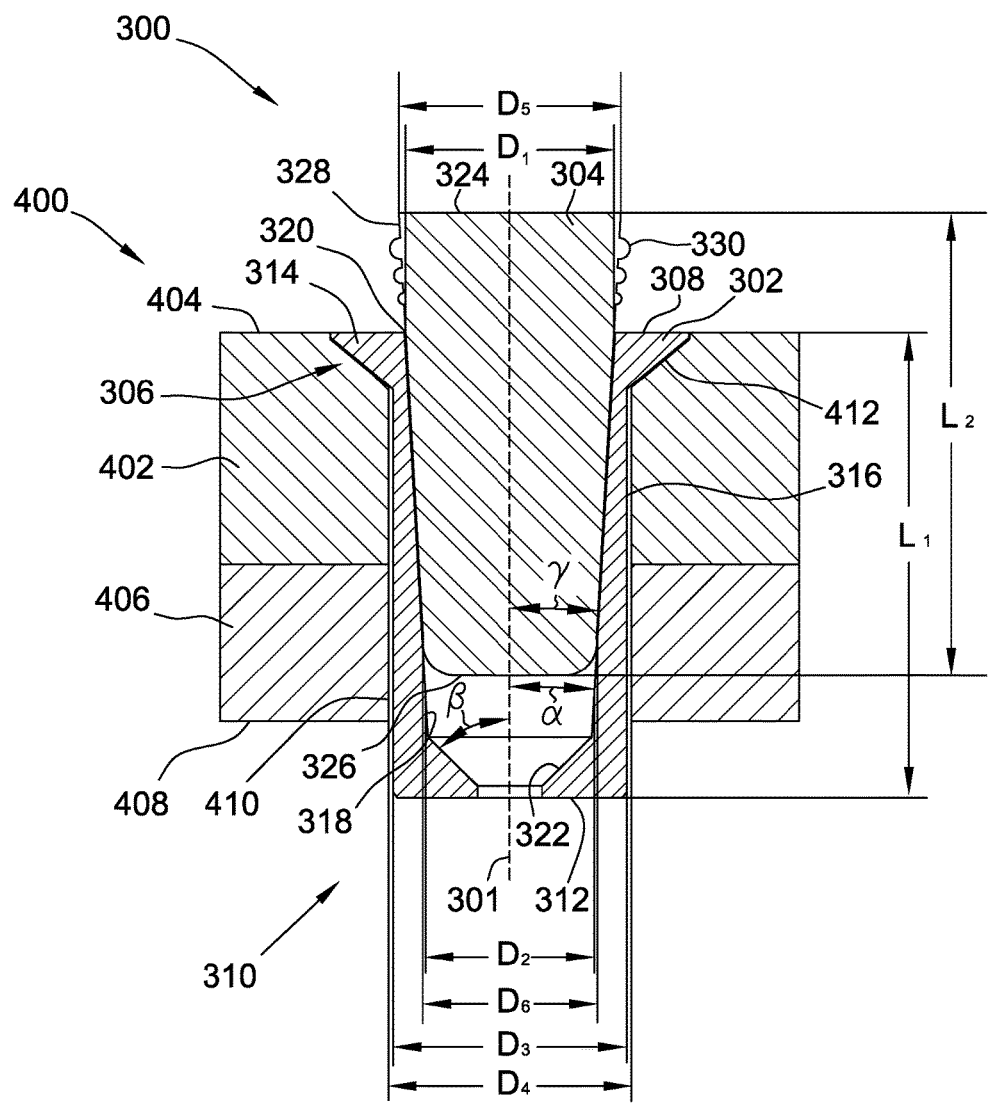
FIG. 2 is a cross-sectional view of the fastener assembly partially inserted into an assembly stack-up.
Figure 3:
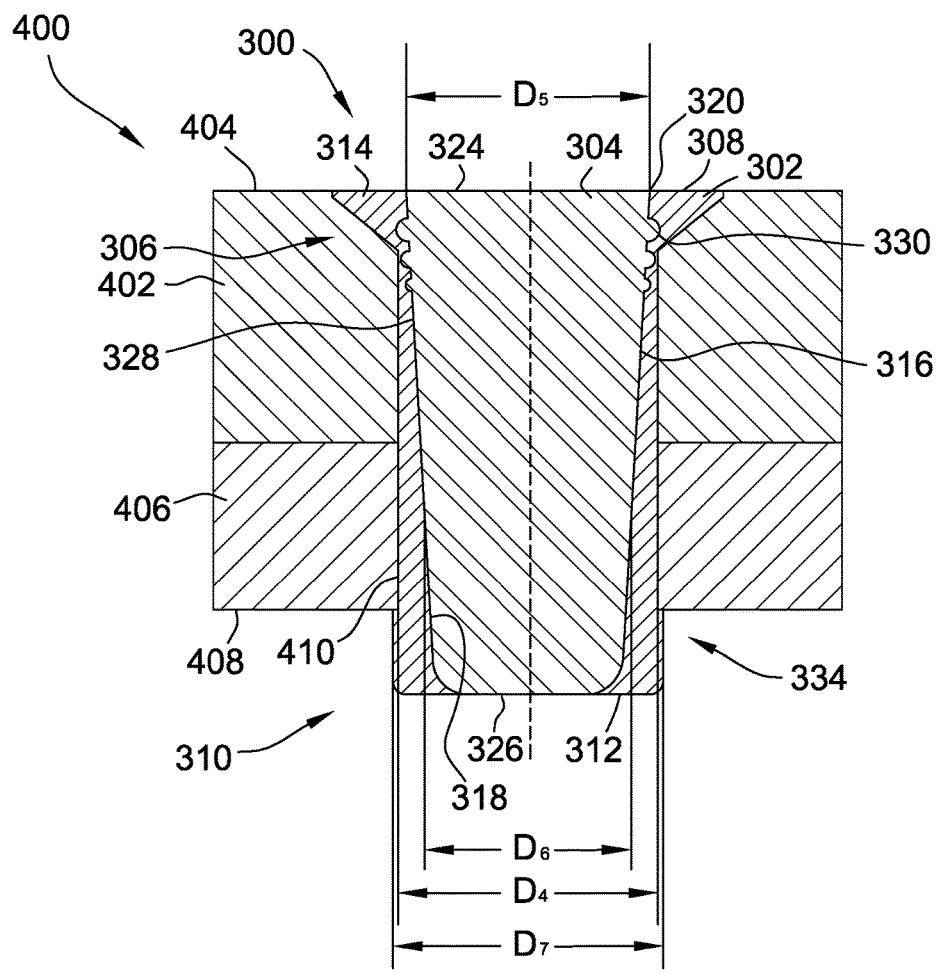
FIG. 3 is a cross-sectional view of the fastener assembly after installation into the assembly stack-up is complete.

FIG. 1 is a perspective view of a partially assembled one-sided fastener assembly 300 including a sleeve 302 and a core 304. FIG. 2 is a cross-sectional view of fastener assembly 300 partially inserted along an axis 301 into an assembly stack-up 400 including a front layer 402 having a front surface 404 and a back layer 406 having a back surface 408. FIG. 3 is a cross-sectional view of fastener assembly 300 after installation into an opening 410 defined between surfaces 404 and 408 of assembly stack-up 400 is complete. Although assembly stack-up 400 is shown as including only two layers 402 and 406, assembly stack-up 400 includes any number of layers as desired.

In the exemplary embodiment, sleeve 302 includes a first end 306 having a first end surface 308 and an opposing second end 310 having a second end surface 312. End surfaces 308 and 312 define a sleeve length L1 therebetween. First end 306 of sleeve 302 includes a head portion 314 extending from first end surface 308 toward second end surface 312. In the exemplary implementation, head portion 314 is sized to fit within a countersink 412 formed in front surface 404 of front layer 402 of assembly stack-up 400. More specifically, head portion 314 is correspondingly sized and shaped to fit within countersink 412 such that first end surface 308 and front surface 404 are substantially flush with each other when fastener assembly 300 is installed in assembly stack-up 400 (as shown in FIGS. 2 and 3).

In the exemplary implementation, sleeve 302 also includes an outer cylindrical surface 316 that extends from head portion 314 to second end surface 312 and an inner tapered surface 318 that extends from first end surface 308 toward second end surface 312. Inner tapered surface 318 at least partially defines an opening 320 extending through sleeve 302. Inner tapered surface 318 is oriented at a first angle α within a range of approximately 0.0 degrees and approximately 10.0 degrees with respect to axis 301. More specifically, inner tapered surface 318 is oriented at a first angle α within a range of approximately 0.0 degrees and approximately 5.0 degrees. Even more specifically, inner tapered surface 318 is oriented at a first angle α within a range of approximately 1.0 degree and approximately 2.0 degrees with respect to axis 301. In the exemplary implementation, sleeve 302 also includes a second inner tapered surface 322 at second end 310. Second tapered surface 322 is oriented at a second angle β with respect to axis 301 that is larger than first angle α such that as core 304 is inserted into opening 320, core 304 contacts second tapered surface 322 and causes a portion of sleeve second end 310 to expand radially outward, as described in further detail below. In one implementation, second tapered surface 322 is substantially parallel to first end surface 308. Alternatively, first inner tapered surface 318 extends from first end surface 308 to second end surface 312 such that inner tapered surface 318 defines a constant taper angle α for the complete length L1 of sleeve 302. In such a configuration, sleeve 302 does not include second tapered surface 322, but core 304 nevertheless expands a portion of sleeve second end 310 radially outward.

As described below, such radial expansion facilitates locking fastener assembly 300 within opening 410 and coupling layers 402 and 406 together. More specifically, in implementations where sleeve second end surface 312 extends beyond back layer back surface 408; such radial expansion facilitates forming a bulb on back surface 408 when installation of fastener assembly 300 is completed. However, in some implementations, second sleeve end surface 312 is substantially flush with back surface 408 such that no bulb is formed.

In the exemplary implementation, core 304 includes a first end surface 324, an opposing second end surface 326, and an outer tapered surface 328 having a length L2 extending therebetween. In the exemplary implementation, core length L2 is less than or substantially similar to sleeve length L1 such that first end surfaces 308 and 324 and also second end surfaces 312 and 326 are substantially flush with each other, respectively, when fastener assembly 300 is installed in assembly stack-up 400 (as shown in FIG. 3). As such, end surface 324 of core 304 and front surface 404 of assembly stack-up front layer 402 are also substantially flush with each other when fastener assembly 300 is installed in assembly stack-up 400 (as shown in FIG. 3). Alternatively, core length L2 is longer that sleeve length L1.

As described herein, core 304 is sized and shaped for insertion into sleeve opening 320 to complete installation of fastener assembly 300 and to couple layers 402 and 404 together. More specifically, outer tapered surface 328 is oriented at a second angle γ with respect to axis 301 that is substantially similar to, or slightly greater than, angle α of inner tapered surface 318. For example, outer tapered surface 328 is also oriented at an angle γ within a range of approximately 0.0 degrees and approximately 10.0 degrees with respect to axis 301 such that tapered surfaces 318 and 324 are complementary. More specifically, outer tapered surface 328 is oriented at a second angle γ within a range of approximately 0.0 degrees and approximately 5.0 degrees. Even more specifically, outer tapered surface 328 is oriented at a second angle γ within a range of approximately 1.0 degree and approximately 2.0 degrees with respect to axis 301.

In the exemplary implementation, core 304 includes a retention feature 330 along outer tapered surface 328. Retention feature 330 engages inner tapered surface 318 of sleeve 302 such that movement of core 304 relative to sleeve 302 is restricted when installation of fastener assembly 300 is complete. In some implementations, sleeve 302 includes a complementary retention feature (not shown) formed in inner tapered surface 318 that engages retention feature 330 of core. In the exemplary implementation, retention feature 330 includes a plurality of circumferential protrusions extending radially outward from outer tapered surface 328. Alternatively, retention feature 330 includes any feature that facilitates restricting movement of core 304 with respect to sleeve 302 once installation of fastener assembly 300 is complete.

Furthermore, in the exemplary implementation, at least one of sleeve 302 and core 304 includes a coating 332. More specifically, coating 332 is applied to at least one of inner tapered surface 318 and outer tapered surface 328. In one implementation, coating 332 includes an anodized layer to protect sleeve 302 and core 304 from corrosion. In another implementation, coating 332 includes an adhesive for restricting movement of core 304 with respect to sleeve 302. For example, inner tapered surface 318 include a first adhesive portion and outer tapered surface 328 includes a second adhesive portion that reacts with the first adhesive portion upon contact to bond sleeve 302 and core 304 together. In another implementation, coating 332 includes a lubricant applied to at least one of inner tapered surface 318 and outer tapered surface 328 that reduces friction therebetween and facilitates insertion of core 304 into sleeve 302.

In the exemplary implementation, sleeve 302 is formed from a first material and core 304 is formed from a second material different than the first material. Sleeve 302 is formed from any of aluminum, titanium, plastic, or stainless steel. More specifically, sleeve 302 is formed from any of the materials listed below:

TABLE 1

| Material | Shear Strength (KSI) | Ductility (Elongation percent in 2 in.) |
| --- | --- | --- |
| 1100 Aluminum | 11 | 20 |
| 2017-T4 Aluminum | 38 | 22 |
| 2117-T4 Aluminum | 28 | 27 |
| 2024-T4 Aluminum | 41 | 19 |
| 3003 Aluminum | 11 | 40 |
| 5052 Aluminum | 18 | 30 |
| CP—Ti Titanium | 55.1 | 28 |

Alternatively, sleeve 302 is formed from any material that facilitates operation of fastener assembly 300 as described herein. In the exemplary implementation, the first material from which sleeve 302 is formed includes a shear strength within a range of approximately 10 kilopounds per square inch (KSI) and approximately 60 KSI. Furthermore, the first material from which sleeve 302 is formed includes a ductility within a range of approximately 15 percent elongation and approximately 50 percent elongation.

Additionally, core 304 is formed from any of aluminum, titanium, plastic and stainless steel that is different than the first material from which sleeve 302 is formed. More specifically, core 304 is formed any of the materials listed below:

TABLE 2

| Material | Shear Strength (KSI) | Elongation percent in 2 in |
| --- | --- | --- |
| 7050-T73 Aluminum | 44 | 11 |
| 7136 Aluminum | 57 | 10 |
| 6Al—4V Titanium | 79.8 | 14 |

Alternatively, core 304 is formed from any material that facilitates operation of fastener assembly 300 as described herein. In the exemplary implementation, the second material from which core 304 is formed includes a shear strength within a range of approximately 40 KSI and approximately 90 KSI. Furthermore, the second material from which core 304 is formed includes a ductility within a range of approximately 8 percent elongation and approximately 20 percent elongation. As such, the first material of sleeve 302 is relatively softer that the second material of core 304, thus enabling sleeve 302 to expand radially to receive core 304 as described below.

In the exemplary implementation, as shown in FIG. 2, opening 320 of sleeve 302 includes a diameter D1 proximate first sleeve end 306 and a diameter D2 proximate second sleeve end 310 prior to completion of fastener assembly 300 installation into assembly stack-up 400. Similarly, outer cylindrical surface 316 defines a constant diameter D3 that is slightly smaller than a constant diameter D4 of assembly stack-up opening 410 to facilitate insertion of sleeve 302 into opening 410 prior to completion of fastener assembly 300 installation. Furthermore, core 304 includes a diameter D5 proximate first end surface 324 that is slightly larger than diameter D1 of sleeve opening 320 at first end 306 prior to completion of fastener assembly 300 installation. Similarly, core 304 includes a diameter D6 proximate second end surface 326 that is slightly larger than second diameter D2 of sleeve opening 320 at second end 310.

During installation, as shown in FIG. 3, an axial force is applied to core end surface 324 to drive core 304 into sleeve opening 320. Because of the difference in materials between sleeve 302 and core 304, the harder material core 304 facilitates radially expanding the softer material sleeve 302 such that fastener assembly 300 applies a compressive force to opening 410 and is coupled to assembly stack-up 400 with an interference fit. As such, after installation of fastener assembly 300 is complete, opening 320 of sleeve 302 proximate first sleeve end 306 includes a diameter substantially equal to diameter D5 of core 304 at end surface 324. More specifically, the pre-assembly diameter D1 of opening 320 has been enlarged by core 304 such that the diameter D1 of opening 320 is now substantially equal to diameter D5 after installation. Similarly, after installation of fastener assembly 300 is complete, opening 320 of sleeve 302 proximate second sleeve end 310 includes a diameter D6 substantially equal to diameter D6 of core 304. As such, core 304 causes radial expansion of sleeve such that the diameters of each are substantially equal at corresponding axial locations.

Furthermore, in embodiments wherein fastener assembly 300 extends beyond back surface 410 of assembly stack-up 400, insertion of core 304 into sleeve 302 causes sleeve 302 to expand to a diameter D7 that is larger than diameter D4 of opening 410 such that a portion of sleeve 302 overlaps back surface 408. As such, sleeve 302 forms a bulb 334 that facilitates coupling fastener assembly 300 to assembly stack-up 400 to secure layers 404 and 406 together. Furthermore, as shown in FIGS. 2 and 3, neither sleeve 302 nor core 304 include a threaded portion or other retention or coupling feature accessible from back surface 408. As described herein, fastener assembly 300 is a purely one-sided fastener installed and driven from the same side of assembly stack-up 400 without requiring manipulating or accessing fastener assembly from back surface 408.

Figure 4:
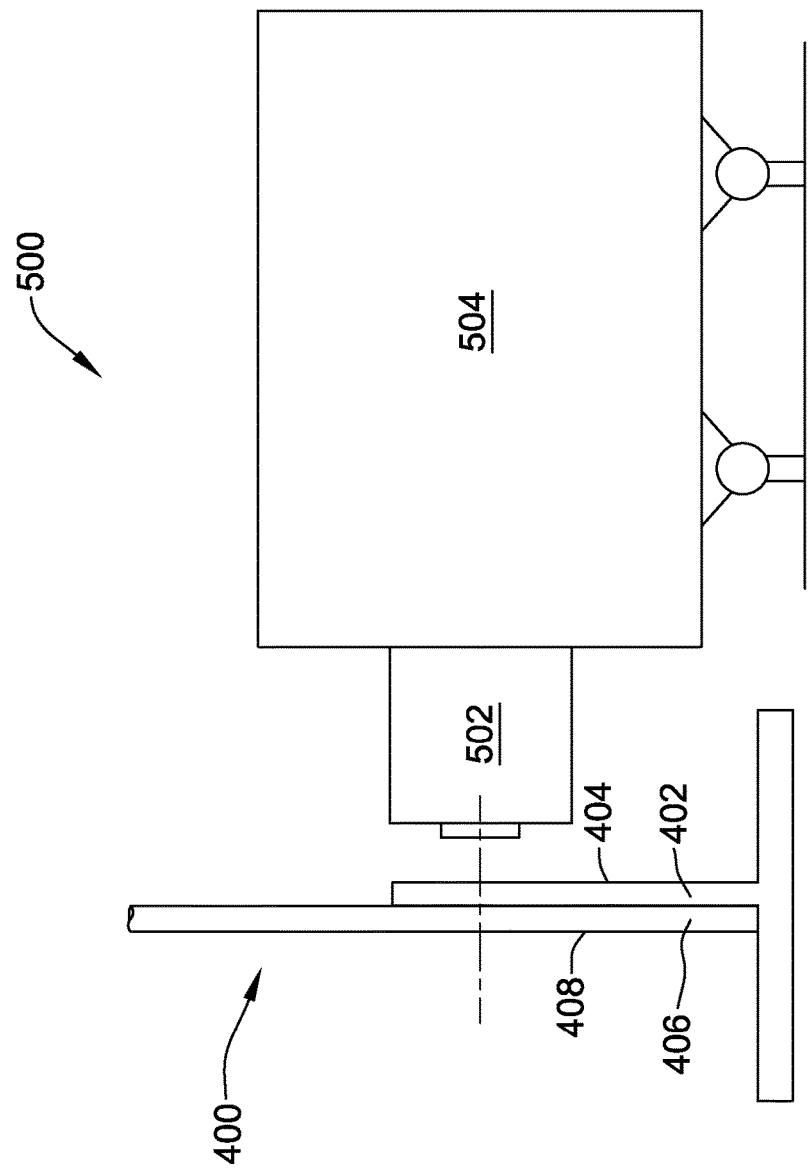
FIG. 4 is a schematic diagram illustrating an exemplary fastener installation system located to a drilling location on the assembly stack-up.

Turning now to FIGS. 4-7, the process for coupling fastener assembly 300 to assembly stack-up 400 is further described. As mentioned above, fastener assembly 300 (not shown in FIG. 4) is utilized to provide an attachment between front layer 402 and back layer 406. In the exemplary implementation, a fastener installation system 500, including fastener assembly 300, is utilized to complete installation. System 500 includes an end effector 502 and a hopper 504 coupled to end effector 502 configured to store a plurality of fastener assemblies 300. As shown in FIG. 4, end effector 502 locates, for example using a vision system at least partially located in end effector 502, a reference point representing a position in assembly stack-up 400 where one-sided fastener assembly 300 is to be installed. In some implementations, embodiments, fastener installation system 500 operates to press front layer 404 and back layer 406 together and is programmed to move to a drilling location that is referenced with respect to the reference point.

Figure 5:
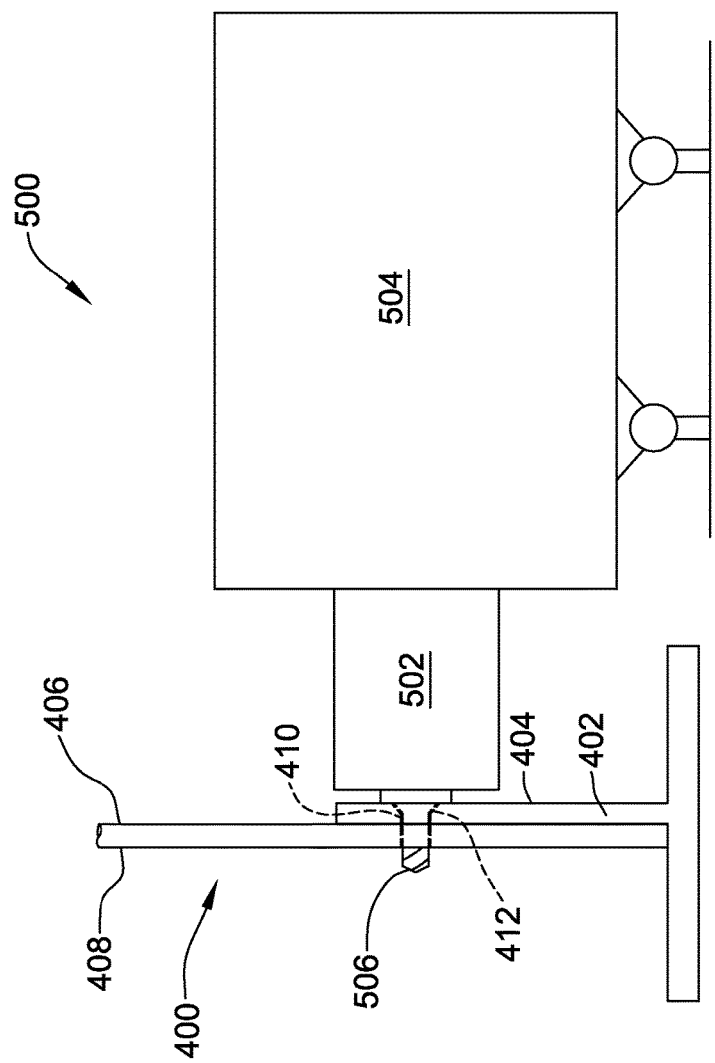
FIG. 5 is a schematic diagram illustrating the fastener installation system of FIG. 4 drilling a hole through the assembly stack-up.

As shown in FIG. 5, fastener installation system 500 extends end effector module 502 incorporating a drill bit 506 towards front layer 404 and back layer 406 and commences to drill hole 410 therethrough. Furthermore, fastener installation system 500 is also operated to form countersink 412 such that upon completion of fastener assembly 300 installation, end surfaces 308 and 324 of sleeve 302 and core 304, respectively, are substantially flush with front surface 404 of assembly stack-up 400.

Figure 6:
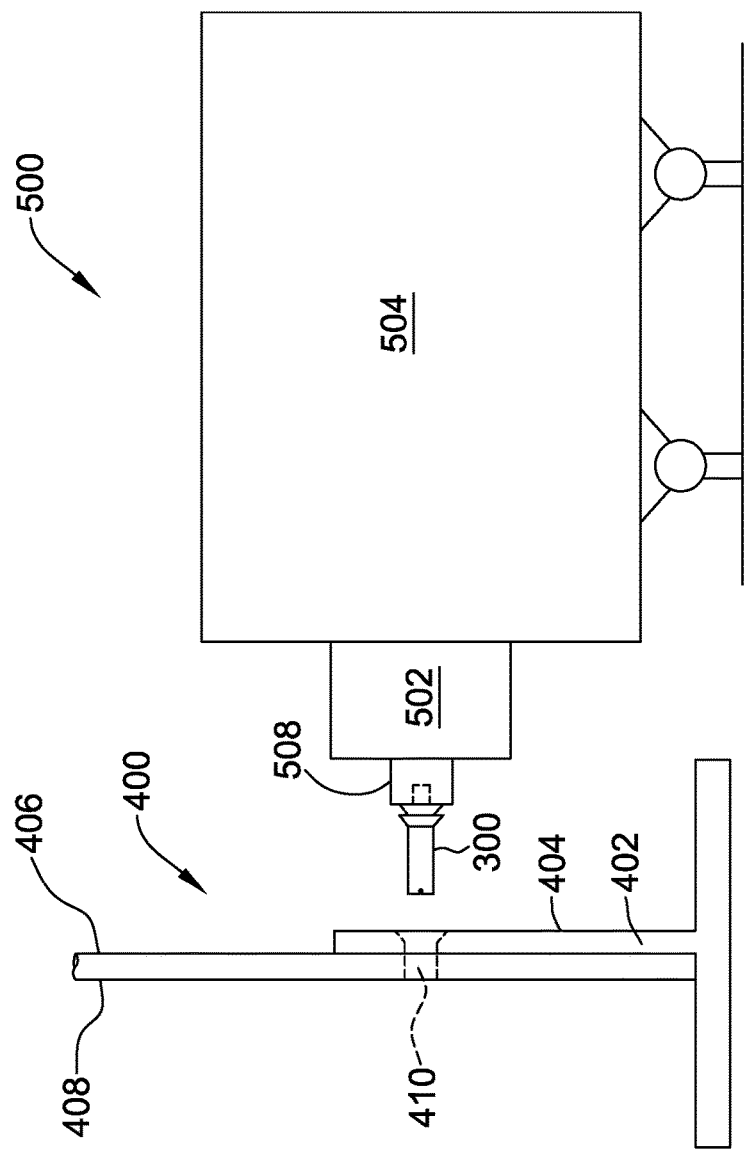
FIG. 6 is a schematic diagram illustrating a fastener feed head of the fastener installation system of FIG. 8 being utilized to insert a fastener assembly into the hole.

FIG. 6 illustrates that drill bit 506 of fastener installation system 500 has been removed from hole 410 and replaced with a fastener feed head 508 to insert fastener assembly 300 into hole 410. In one implementation, fastener assemblies 300 are partially pre-assembled with core 304 partially inserted into sleeve 302 (as shown in FIG. 4) before being stored in hopper 504. As such, fastener feed head 508 engages one of sleeve 302 and core 304 and inserts the entire fastener assembly 300 into opening 410. In other implementations, fastener feed head 508, or another component of fastener installation system 500, partially inserts core 304 into sleeve 302. More specifically, fastener system 500 inserts core 304 into sleeve 302 and stores the partially assembled fastener assembly 300 in hopper 504. Alternatively, hopper 504 includes dividers (not shown) that separately store sleeve 302, core 304, and partially assembled fastener assembly 300.

Figure 7:
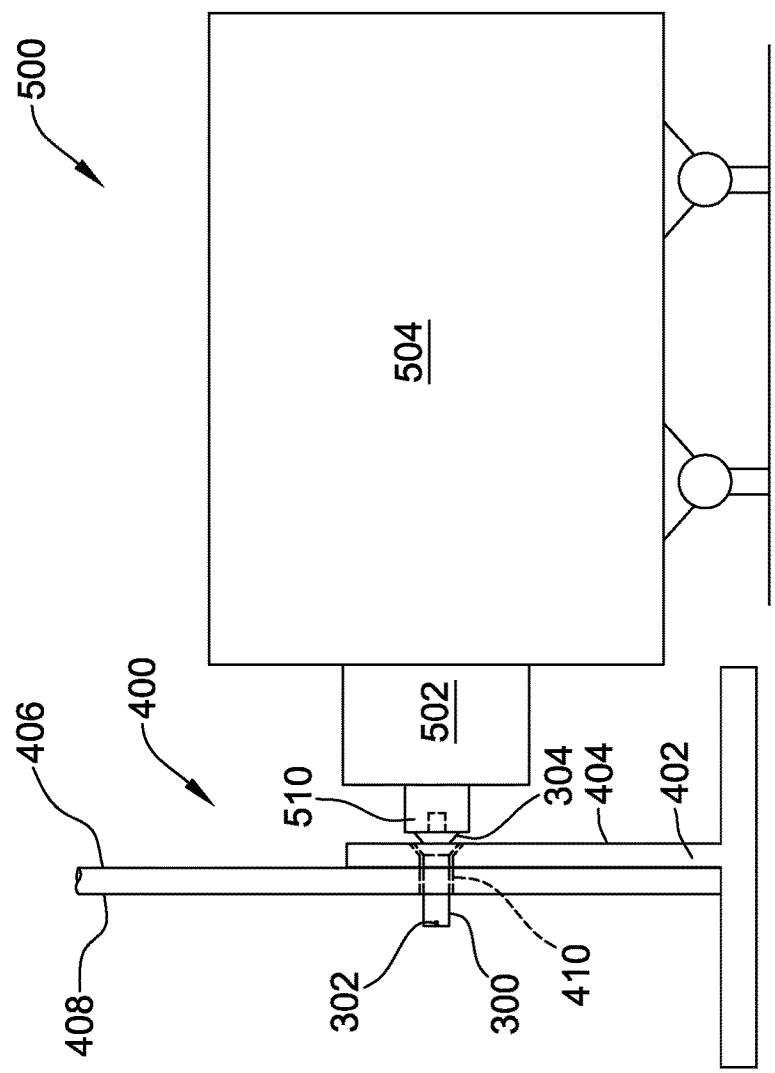
FIG. 7 is a schematic diagram illustrating a fastener driver of the fastener installation system of FIG. 8 being utilized to drive the fastener assembly into the hole.

FIG. 7 illustrates that fastener feed head 508 of fastener installation system 500 has been removed from end effector 502 and replaced with a fastener drive head 510 to drive fastener assembly 300 into hole 410. Alternatively, fastener feed head 508 also operates as a driver and drives fastener assembly 300 into hole 410 to complete installation of fastener assembly 300. In the exemplary implementation, fastener drive head 510 applies an axial force to end surface 324 of core 304 and drive core 304 along axis 301 into sleeve opening 320 to complete installation of one-sided fastener assembly 300. More specifically, fastener drive head 510 applies an axial force until first end surface 308 of sleeve 302 is substantially flush with front surface 404 of assembly stack-up 400 and until first end surface 324 of core 304 is substantially flush with first end surface 308 of sleeve 302 and with front surface 404 of assembly stack-up 400. In some implementations, fastener drive head 510 applies an axial force until first end surface 308 of sleeve 302 is pushed beyond (inward of) front surface 404 of assembly stack-up 400 and until first end surface 324 of core 304 is pushed beyond (inward of) at least one of first end surface 308 of sleeve 302 and front surface 404 of assembly stack-up 400. In some implementations, fastener drive head 510 applies an axial force until second end surface 326 of core 304 is substantially flush with second end surface 312 of sleeve 302. In all implementations, fastener drive head 510 applies an axial force to core 304 such that core 304 engages sleeve 302 and causes at least a portion of sleeve 302 to radially expand to provide an interference fit between fastener assembly 300 and assembly stack-up 400.

Figure 8:
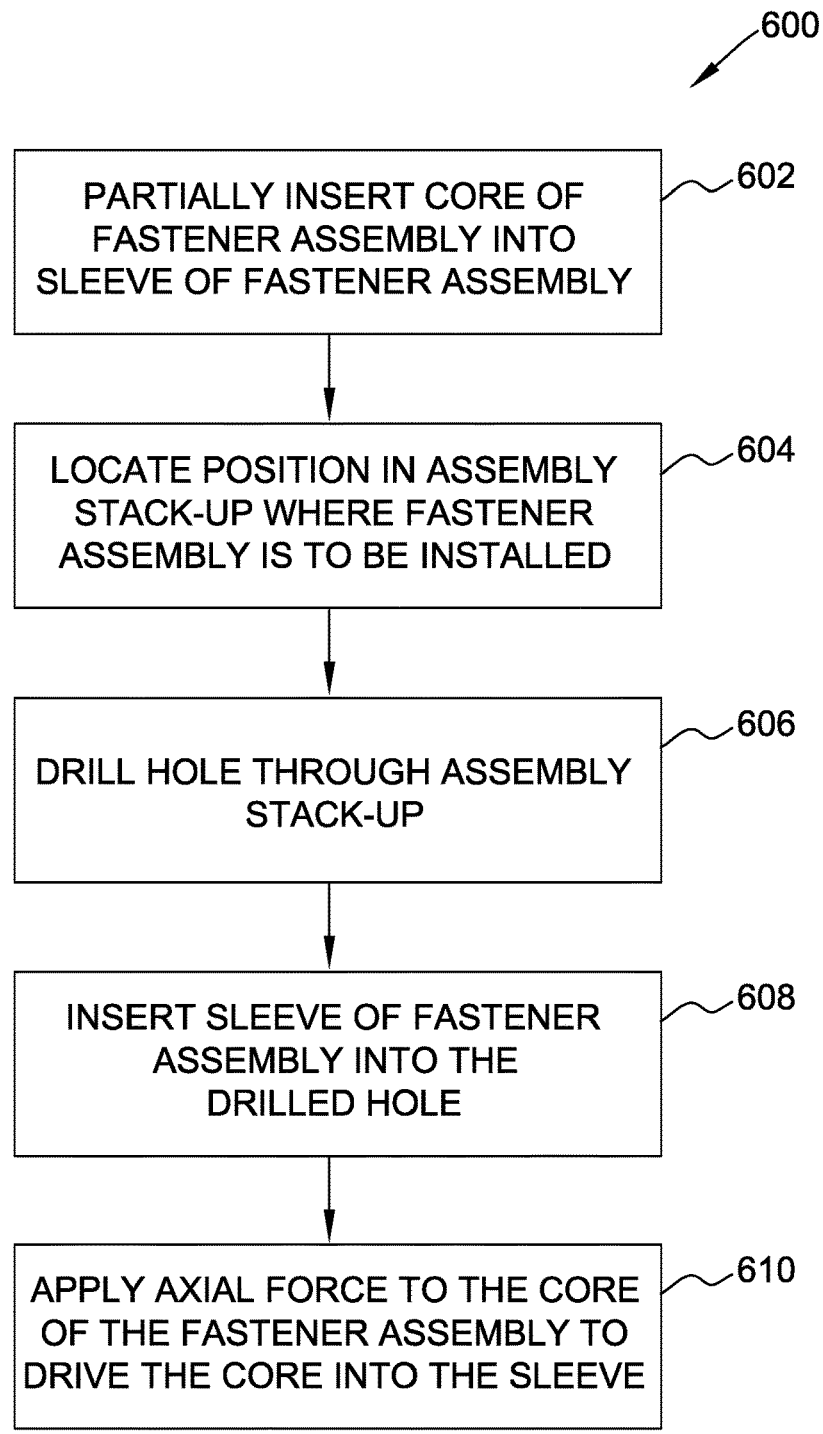
FIG. 8 is a flowchart illustrating a method for installing a one-sided fastener assembly into an assembly stack-up utilizing the described embodiments.

FIG. 8 is a flowchart illustrating the above described method 600 for installing fastener assembly 300 to assembly stack-up 400 using fastener installation system 500. Method 600 includes partially inserting 602 core 304 of one-sided fastener assembly 300 into opening 410 defined in sleeve 302 of one-sided fastener assembly 300. Inner tapered surface 318 of sleeve 302 guides corresponding outer tapered surface 328 of core 304 axially into sleeve opening 320.

Method 600 also includes locating 604 a position in assembly stack-up 400 where one-sided fastener assembly 300 is to be installed and drilling 606 a hole 410 through assembly stack-up 400 at the position. As described above, hole 410 is countersunk to a specified depth such that at least assembly stack-up front surface 404 and sleeve end surface 308 are substantially flush when fastener assembly 300 is installed.

Method 600 further includes inserting 608 sleeve 302 of partially assembled one-sided fastener assembly 300 into hole 410 and applying 610 an axial force to core 304 to drive core 304 into sleeve opening 320 to complete installation of one-sided fastener assembly 300. In the exemplary implementation, fastener drive head 510 of fastener installation system 500 applies 610 an axial force to core 304 until first end surface 308 of sleeve 302 is substantially flush with front surface 404 of assembly stack-up 400 and until first end surface 324 of core 304 is substantially flush with first end surface 308 of sleeve 302 and with front surface 404 of assembly stack-up 400. In some implementations, fastener drive head 510 applies 610 an axial force until second end surface 326 of core 304 is substantially flush with second end surface 312 of sleeve 302.

In alternative implementations, an impact gun is used to apply the axial force required to drive fastener assembly 300 into assembly stack-up 400. More specifically, the impact gun utilizes repeated impacts with core 304 to drive core 304 into sleeve 302, and, thus, drive fastener assembly 300 into assembly stack-up 400. In all implementations, an axial force to core 304 such that core 304 engages sleeve 302 and causes at least a portion of sleeve 302 to radially expand to provide an interference fit between fastener assembly 300 and assembly stack-up 400.

Additionally, each step of inserting 602, locating 604, drilling 606, inserting 608, and applying 610 are performed from the same side of assembly stack-up 400. More specifically, each step of method 600 is performed from same side (front surface 404) of assembly stack-up 400 without manipulating or accessing fastener assembly 300 from back surface 408 of assembly stack-up 400.

Figure 9:
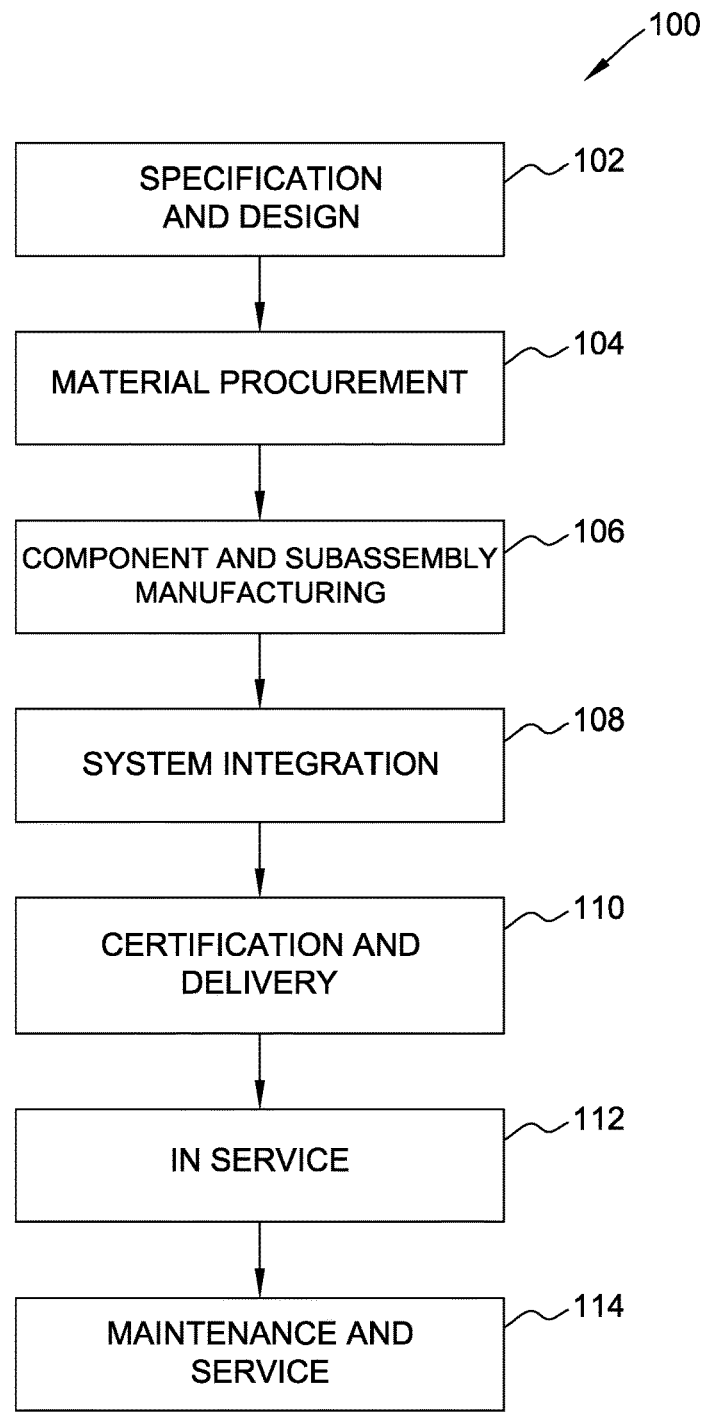
FIG. 9 is a flow diagram of an aircraft production and service methodology.
Figure 10:
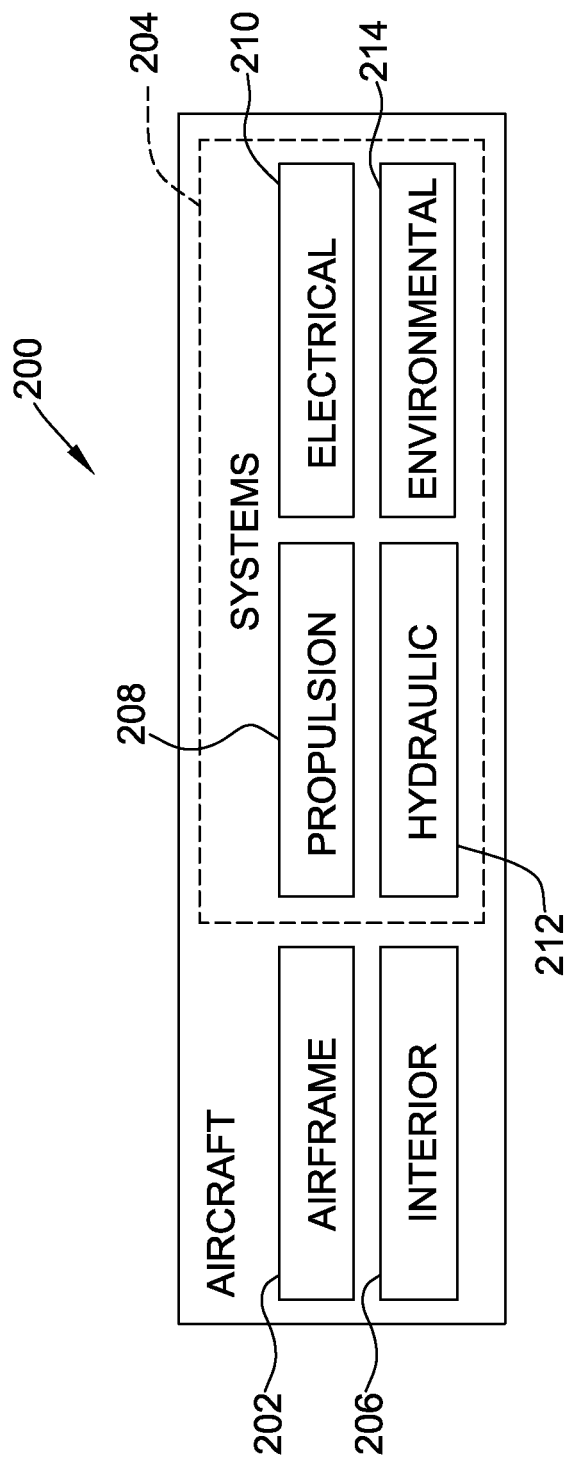
FIG. 10 is a block diagram of an aircraft.

Referring more particularly to the drawings, embodiments of the disclosure may be described in the context of aircraft manufacturing and service method 100 as shown in FIG. 9 and an aircraft 200 as shown in FIG. 10. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 10, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The embodiments described herein facilitate installing a one-sided fastener assembly into an assembly stack-up. The fastener assembly includes a sleeve and a core that are partially pre-assembled and inserted into a countersunk hole drilled in the assembly stack-up. After insertion, a robot or a technician drives the core into the sleeve causing the sleeve to radially expand into the hole. The core is driven until the front surface of the sleeve and the front surface of the core are substantially flush with the front surface of the assembly stack-up. When the core is driven as such, it forces the sleeve to expand radially outward and create an interference fit with the inner surface of the assembly stack-up to retain the fastener assembly within the structure. In some embodiments, an inner portion of the sleeve expands radially outward to form a bulb on an inner surface of the assembly stack-up.

As described herein, the fastener installation system causes the sleeve of the fastener assembly to expand to create an interference fit with the assembly stack-up. Such hole expansion is critical for fatigue related joints and is enabled by the tapered geometry and the material selection for the core (material with higher shear strength and lower ductility) and the sleeve (material with a lower shear strength and higher ductilty). Additionally, the fastener installation system described herein allows for enhanced flushness control because the a similar axial force is applied to each core such that the core is pushed to the same position on every installation of a fastener assembly.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A one-sided fastener assembly for use in coupling an assembly stack-up, said fastener assembly comprising:
   a sleeve comprising an outer cylindrical surface and an inner tapered surface oriented at a first angle with respect to said outer surface, said inner tapered surface extending from a first end surface of said sleeve to define an opening extending through said sleeve, wherein said sleeve is formed from first material; and
   a core extending along an axis and configured for insertion into the opening, wherein said core is formed from a second material different from the first material, said core comprising a first end surface, an opposing second end surface, and an outer tapered surface extending from said first end surface to said second end surface, said outer tapered surface oriented at a second angle with respect to said axis configured for engagement with said sleeve inner tapered surface such that insertion of said core into said sleeve causes radial expansion of said sleeve creating an interference fit with the assembly stack-up.

2. The fastener assembly in accordance with claim 1, wherein the first material includes a shear strength within a range of approximately 15 kilopounds per square inch (KSI) and approximately 50 KSI, and wherein the second material includes a shear strength within a range of approximately 8 KSI and approximately 20 KSI.

3. The fastener assembly in accordance with claim 1, wherein at least one of said inner tapered surface and said outer tapered surface includes a coating.

4. The fastener assembly in accordance with claim 1, wherein said first angle is substantially similar to said second angle.

5. The fastener assembly in accordance with claim 1, wherein said sleeve comprises a head configured for insertion into a countersink formed in a front surface of the stack-up such that an end surface of said head is configured to be substantially flush with the front surface of the stack-up when assembled.

6. The fastener assembly in accordance with claim 5, wherein said core comprises an end surface configured to be substantially flush with said sleeve head end surface and the front surface of the stack-up when assembled.

7. The fastener assembly in accordance with claim 1, wherein said sleeve defines a first length and said core defines a second length less than or equal to the first length.

8. The fastener assembly in accordance with claim 1, wherein said sleeve comprises a second inner tapered surface, wherein said core is configured to engage said second inner tapered surface such that a portion of said outer cylindrical surface is expanded radially outward.

9. The fastener assembly in accordance with claim 1, wherein at least one of said inner tapered surface and said outer tapered surface comprises a retention feature configured to restrict movement of said core relative to said sleeve.

10. A method of installing a one-sided fastener assembly into an assembly stack-up, said method comprising:
partially inserting a core of the one-sided fastener assembly into an opening defined in a sleeve of the one-sided fastener assembly, wherein an inner tapered surface extends from a first end surface of the sleeve and is configured to guide a corresponding outer tapered surface of the core, the outer tapered surface extending from a first end surface of the core to a second end surface of the core;
locating a position in an assembly stack-up where the one-sided fastener assembly is to be installed;
drilling hole through the assembly stack-up at the position;
inserting the sleeve of the partially assembled one-sided fastener assembly into the hole;
applying an axial force to the core to drive the core into the sleeve opening until an end surface of a head of the sleeve is substantially flush with a front surface of the assembly stack-up and until an end surface of the core is substantially flush with the end surface of the sleeve and the front surface of the assembly stack-up to complete installation of the one-sided fastener assembly.

11. The method in accordance with claim 10, wherein applying an axial force comprises applying an axial force to the core until a first end surface of the core is substantially flush with a first end surface of the sleeve.

12. The method in accordance with claim 10 further comprising countersinking the hole to a specified depth such that an end surface of a head of the sleeve is substantially flush with a front surface of the assembly stack-up after installation of the one-sided fastener assembly is complete.

13. The method in accordance with claim 10, wherein applying an axial force comprises applying an axial force to the core such that the core engages the sleeve and causes a portion of the sleeve to translate in a radial direction.

14. The method in accordance with claim 10, wherein the steps of inserting, locating, drilling, inserting, and applying are performed from the same side of the assembly stack-up.

15. A fastener installation system for installing a fastener assembly onto an assembly stack-up, said system comprising:
at least one fastener assembly comprising:
a sleeve comprising an outer cylindrical surface and an inner tapered surface extending from a first end surface of said sleeve to define an opening extending through said sleeve; and
a core extending along an axis and configured for insertion into the opening, said core comprising a first end surface, an opposing second end surface, and an outer tapered surface extending from said first end surface to said second end surface, said outer tapered surface configured for engagement with said inner tapered surface;
an end effector configured to insert said at least one fastener assembly into a hole defined in the assembly stack-up;
a hopper coupled to said end effector, said hopper configured to store a plurality of fastener assemblies; and
a fastener driver coupled to said end effector and configured to apply an axial force to said core to complete installation of said at least one fastener assembly.

16. The fastener installation system of claim 15, further comprising a fastener feed head coupled to said end effector, said fastener feed head configured to insert said at least one fastener assembly into the hole in the assembly stack-up.

17. A one-sided fastener assembly for use in coupling an assembly stack-up, said fastener assembly comprising:
a sleeve comprising an outer cylindrical surface and an inner tapered surface oriented at a first angle with respect to said outer surface, said inner tapered surface extending from a first end surface of said sleeve to define an opening extending through said sleeve; and
a core extending along an axis and configured for insertion into the opening, said core comprising a first end surface, an opposing second end surface, and an outer tapered surface extending from said first end surface to said second end surface, said outer tapered surface oriented at a second angle with respect to said axis configured for engagement with said sleeve inner tapered surface such that insertion of said core into said sleeve causes radial expansion of said sleeve creating an interference fit with the assembly stack-up, wherein at least one of said inner tapered surface and said outer tapered surface comprises a retention feature configured to restrict movement of said core relative to said sleeve.

18. A fastener installation system for installing a fastener assembly onto an assembly stack-up, said system comprising:
at least one fastener assembly comprising:
a sleeve comprising an outer cylindrical surface and an inner tapered surface extending from a first end surface of said sleeve to define an opening extending through said sleeve; and
a core extending along an axis and configured for insertion into the opening, said core comprising a first end surface, an opposing second end surface, and an outer tapered surface extending from said first end surface to said second end surface, said outer tapered surface configured for engagement with said inner tapered surface;
an end effector configured to insert said at least one fastener assembly into a hole defined in the assembly stack-up;
a fastener feed head coupled to said end effector, said fastener feed head configured to insert said at least one fastener assembly into the hole in the assembly stack-up; and
a fastener driver coupled to said end effector and configured to apply an axial force to said core to complete installation of said at least one fastener assembly.

19. The fastener assembly in accordance with claim 17, wherein at least one of said inner tapered surface and said outer tapered surface includes a coating.

20. The fastener assembly in accordance with claim 17, wherein said sleeve comprises a second inner tapered surface, wherein said core is configured to engage said second inner tapered surface such that a portion of said outer cylindrical surface is expanded radially outward.

* * * * *